United States Patent [19]
Goldberg et al.

[11] Patent Number: 6,075,844
[45] Date of Patent: Jun. 13, 2000

[54] MESSAGING SYSTEM WITH REMOTE MESSAGING RECORDING DEVICE WHERE THE MESSAGE IS ROUTED BASED ON THE SPOKEN NAME OF THE RECIPIENT

[75] Inventors: Randy G. Goldberg, Princeton; Steven H. Lewis, Middletown, both of N.J.

[73] Assignee: AT&T Corp., New York, N.Y.

[21] Appl. No.: 08/972,725

[22] Filed: Nov. 18, 1997

[51] Int. Cl.[7] .................................................. H04M 1/658
[52] U.S. Cl. .................................. 379/88.17; 379/88.04; 379/88.28; 704/275
[58] Field of Search .............................. 379/88.01, 88.04, 379/88.17, 88.27, 88.28; 704/270, 275

[56] References Cited

U.S. PATENT DOCUMENTS

| | | | |
|---|---|---|---|
| 4,856,066 | 8/1989 | Lemelson | 704/275 |
| 5,199,062 | 3/1993 | Von Meister et al. | 379/88.04 |
| 5,297,183 | 3/1994 | Bareis et al. | 455/410 |
| 5,452,340 | 9/1995 | Engelbeck et al. | 379/88.03 |
| 5,610,774 | 3/1997 | Hayashi et al. | 360/15 |
| 5,632,002 | 5/1997 | Hashimoto et al. | 704/231 |
| 5,638,425 | 6/1997 | Meador, III et al. | 379/88.01 |
| 5,648,760 | 7/1997 | Kumar | 514/374 |
| 5,719,921 | 2/1998 | Vysotsky et al. | 379/88.01 |
| 5,721,827 | 2/1998 | Logan et al. | 709/217 |
| 5,742,905 | 4/1998 | Pepe et al. | 455/461 |
| 5,752,230 | 5/1998 | Alonso-Cedo | 704/270 |
| 5,819,005 | 10/1998 | Daly et al. | 704/200 |
| 5,881,134 | 3/1999 | Foster et al. | 379/88.01 |

OTHER PUBLICATIONS

Harry Newton, Newton's Telecom Dictionary, 8th Ed., ISBN 0–936648–60–0, pp. 543, 871–2, & 920, Nov. 1994.

*Primary Examiner*—Krista Zele
*Assistant Examiner*—Roland G. Foster
*Attorney, Agent, or Firm*—Kenyon & Kenyon

[57] ABSTRACT

A messaging system with a remote message recording device is provided. To compose and send a message to an intended recipient, the sending party remotely records a spoken message on a recording device. When recording the message, the sending party adds a predefined spoken header before the actual subject matter of the message and also adds a predefined spoken closure comment at the end of the message. The spoken header includes identification information for the intended recipient of the message. To transmit the message to the intended recipient, the sending party downloads the recorded message to a message transmission system. The transmission system includes speech recognition software. The speech recognition software interprets the identification information for the intended recipient contained in the spoken header of the message. The transmission system utilizes this identification information for the intended recipient to access a database that contains a routing access code for the intended recipient. The transmission system transmits the message to the intended recipient by utilizing the routing access code obtained from the database.

12 Claims, 1 Drawing Sheet

MESSAGING SYSTEM WITH REMOTE MESSAGING RECORDING DEVICE WHERE THE MESSAGE IS ROUTED BASED ON THE SPOKEN NAME OF THE RECIPIENT

BACKGROUND OF THE INVENTION

The present invention relates to a messaging system for generating and sending messages to a particular recipient(s). More specifically, the invention provides for remotely generating messages to be sent to a recipient by utilizing a portable recording device, downloading the remotely generated message to a message transmission system, and automatically transmitting the remotely generated message to the intended recipient.

Currently, it is possible to compose and send messages to persons through the use of various communication systems. For example, voice mail systems and electronic mail systems may be used to compose and send messages to a particular intended recipient. It is also possible to remotely record a message, i.e., independent from the communication system that will be utilized to ultimately transmit the message, and to transfer the recorded message to the communication system for transmission to the intended recipient. A most basic example of this methodology would be to record a spoken message by using a tape recorder, call the intended recipient's telephone voice mail system, and play the tape recorded message over the telephone connection. In this manner, the sending party is able to remotely record a message for an intended recipient. The ability to remotely record a message has particular utility in the situation where the sending party wants to record a message while the subject of the message is still fresh in their mind and then later transmit the message to the intended recipient through use of a communication system.

There are drawbacks, however, with the currently known methods for transmitting a remotely recorded message to an intended recipient. Whereas the sending party is able to record the message remote from the communication system, and thus is able to concentrate on composing the message at any time that may be convenient to the sending party, the sending party must re-acquaint themselves with the message at some point in the future in order to transmit the message to the intended recipient. For example, the sending party may have to listen to the recorded message to remember who the intended recipient is and, even if they remember who the message is to be sent to, the sending party must take affirmative actions to transmit the message to the recipient. These affirmative acts may include looking up the e-mail or voice mail address of the intended recipient, establishing a connection between the sending party's message transmission system, e.g., personal computer or telephone, and the recipient's message receiving system, and transmitting the message to the intended recipient. The requirement for the sending party to take these affirmative actions in order to actually transmit the remotely recorded message to the intended recipient mitigates against the benefits obtainable from being able to remotely record messages for an intended recipient.

The ability to remotely record the message allows the sending party to expend effort on this task at a time when it is convenient to the sending party. To require the sending party to re-acquaint himself or herself with the whole issue of sending the message to the intended recipient at a later time in order to actually transmit the message to the intended recipient can be inconvenient and will certainly require additional time and effort.

Therefore, it would be desirable to provide a remote messaging system that would allow the sending party to remotely record a message for an intended recipient and to automatically transmit the remotely recorded message to the intended recipient upon downloading of the message to the communication transmission system without requiring any further actions from the sending party. In this manner, a sending party can compose a message at a convenient time and place and later transmit the message to the intended recipient simply by downloading the recorded message to the message transmission system.

SUMMARY OF THE INVENTION

The drawbacks in the prior art are overcome by the present invention for a messaging system with a remote recording device. In accordance with the present invention, a remote recording device and a message transmission system is provided. To compose and send a message to an intended recipient, the sending party records a spoken message on a recording device. When recording the message, the sending party adds a predefined spoken header before the actual subject matter of the message. The spoken header includes identification information specifying the intended recipient of the message. The sending party also adds a predefined spoken closure comment at the end of the message. The closure comment is utilized to signify the end of the message.

To transmit the message to the intended recipient, the sending party downloads the recorded message to a message transmission system. The transmission system includes speech recognition software. The speech recognition software interprets the intended recipient identification information that is contained in the spoken header of the message. The transmission system utilizes this identification information to access a database that contains a routing access code for the intended recipient. The transmission system transmits the message to the intended recipient by using the routing access code obtained from the database.

In this manner, the present invention provides for remotely recording a message for an intended recipient and automatically transmitting the message to the intended recipient, without intervention by the sending party, after downloading of the recorded message to the message transmission system. The present invention allows the sending party of a message to compose the message when convenient and to automatically transmit the message to the intended recipient without requiring any affirmative acts on the part of the sending party to transmit the message.

DETAILED DESCRIPTION

Figure 1:
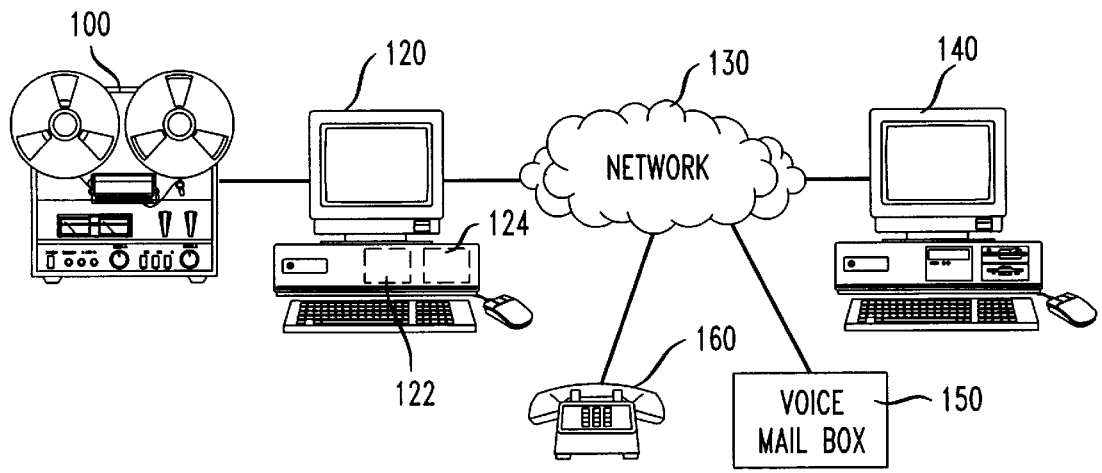
FIG. 1 illustrates an embodiment for the messaging system of the present invention.

FIG. 1 illustrates one embodiment for the messaging system of the present invention. As can be seen, a remote recording device 100, a personal computer (PC) 120 for use by the sending party, a network 130, and several alternative devices for receiving a message by the intended recipient(s) are illustrated. These alternative receiving devices are illustrated as the intended recipient's PC 140, voice mail box 150, and telephone 160. Network 130 provides interconnection between the sending party's PC 120 and the intended recipient's receiving device(s).

In practicing the present invention, a party that desires to compose and send a message to an intended recipient will utilize remote recording device 100 and the sending party's PC 120. The message to be sent will be transmitted by the sending party's PC 120 over network 130 to the recipient's receiving device, however, it is not required that the message be transmitted over a network or that the message be delivered to any particular type of recipient receiving device. Many alternative implementations are possible for both the message receiving device for the receiving party and the connection mechanism for interconnecting the sending party's PC to the recipient's receiving device. For example, the present invention is capable of transmitting messages to an intended recipient's telephone, telephone answering machine, voice mail box, and the intended recipient's personal computer. As such, a data network, an integrated services network, a telephone network, or a dedicated connection between the sending party's PC and the recipient's receiving device can be utilized to interconnect the sending party's PC to the recipient's receiving device. Therefore, the present invention is not limited to any particular interconnection means for connecting the sending party's PC to the recipient's receiving device or by the types of receiving devices that may be utilized by the receiving party. For purposes of illustration, one embodiment for practicing the present invention where a message is transmitted to a recipient's PC 140 over a network 130 will be described.

In order to compose a message to be transmitted to an intended recipient, the sending party utilizes remote recording device 100. Remote recording device 100 could be a portable analog tape recorder, similar to a dictaphone. Remote recording device 100 could equally be any portable recording device capable of storing an audio message. When the message is composed, the recording device 100 is not electronically connected to the message transmission system, i.e., the sending party's PC 120, but rather, is located remote from the sending party's PC 120. As such, a sending party is able to compose messages while located remote from a message transmission system and record the messages for later transmission by the message transmission system.

To compose and record a message for transmission by the sending party's PC 120 to an intended recipient, the sending party speaks into recording device 100. When composing a message, the sending party will precede the actual message subject matter by recording a pre-defined spoken message header and will conclude the message by using a pre-defined spoken message trailer. The message header and trailer can be of any defined format with the only requirement being that the format must be recognizable by speech recognition software 122 that is stored on the sending party's PC 120. The use of the speech recognition software will be more fully described later in this specification.

The message header is utilized to identify the intended recipient for the recorded message and the trailer is utilized to signify the end of the message. The header, for example, may be of a format such as "Message to Robert Smith" and the trailer may be of a format such as "End Of Message." Thus, the predefined format for the header would be the "Message to" preparatory phrase followed by the spoken name of the intended recipient. The predefined format for the trailer would be the "End Of Message" phrase, which would be the same phrase that would be utilized to signify the end of each recorded message.

As mentioned previously, the actual substance of the message to be sent is spoken and recorded by the sending party after recording the header and before recording the trailer. An example of a complete spoken message composed by the sender and recorded by recording device 100 would be as follows: "Message to Robert Smith—Hi Robert, I just reviewed your proposal and have some comments on it. Please call me at my office to discuss—End Of Message"

After remotely recording the message on recording device 100, the sending party will download the recorded message from recording device 100 to the sending party's PC 120. A variety of ways are possible for downloading the recorded message to the sending party's PC, such as, for example, connecting the analog output of the recording device to the analog input of a sound-card on a PC by utilizing a cable and electronically downloading the audio signal to the PC. The present invention is not limited to any particular method for downloading the recorded audio signal to PC 120. The only requirement is that the recorded message be transferred to PC 120 for ultimate transmission of the message to the intended recipient.

When the recorded message is downloaded to PC 120, as mentioned previously, the speech recognition software 122 stored on PC 120 is utilized to interpret the header and trailer information of the message. Through use of the speech recognition software, computer 120 is able to determine who the intended recipient for the message is. The speech recognition software, for our sample message above, will interpret the spoken header information and determine that the message is to be transmitted to "Robert Smith".

After recognizing that the message is to be transmitted to Robert Smith, computer 120, through software, will utilize this identifying information for the intended recipient to access database 124 to determine the appropriate routing access code for delivering the message to Robert Smith. Thus, database 124 must contain routing access code information for Robert Smith and all potential intended recipients. This routing access code can be a variety of information, e.g., an electronic mail (e-mail) address, a telephone number, or a voice mail box number, depending upon how the message is to be transmitted to the intended recipient. However, regardless of the format utilized for the routing access code, the code is utilized by computer 120 to transmit the message to the intended recipient. In the embodiment where the sending party's PC is interconnected to the intended recipient's PC, i.e., Robert Smith's PC, through network 130, the routing access code could be Robert Smith's e-mail address.

In continuing with the discussion of downloading the recorded message to PC 120, when the speech recognition software recognizes that the recorded header information has been played and is therefore complete, computer 120 will record the substantive text of the message, i.e., "Hi Robert, I just reviewed your proposal and have some comments on it. Please call me at my office to discuss." Computer 120 will convert this analog voice signal message into a digital file and store this file for transmission to the intended recipient. Files could be created on a per message basis. Alternatively, files could be created on a per recipient basis. In such a circumstance multiple messages may be on file for a single intended recipient. When the speech recognition software recognizes the spoken trailer, i.e., the spoken "End Of Message" phrase, the computer will know that the substantive text of the message has ended and will cease storing information to that message file. This has particular utility where multiple messages are recorded on the recording device.

After the recorded message has been downloaded to the sending party's PC 120, the sending party's PC will utilize the accessed routing access code from database 124 to establish a connection with the intended recipient's receiving device and transmit the message to the intended recipient. In this manner, the message is automatically transmitted to the intended recipient, after downloading to the sending party's PC 120, without requiring any intervention by the sending party.

As discussed above, the message may be transmitted to the intended recipient in a variety of ways. For example, if the message is transmitted to the intended recipient's PC 140, the message can be an audio attachment, e.g., a wavefile, to an e-mail message. The intended recipient's PC 140 would receive the e-mail message and attached audio file and would play the audio file for the intended recipient.

If the message is to be transmitted to the intended recipient's telephone, telephone answering machine, or voice-mail system if the recipient has a separate voice-mail address, the sending party's PC can establish a connection with the intended recipient's telephone or voice-mail system and play the recorded message for the intended recipient. If the message is transmitted to the telephone of the intended recipient, and therefore the telephone may be answered by the intended recipient directly, the system is able to provide a short pre-amble to the message, such as "The following is a recorded message from [sending party's name]" before playing the actual message from the sending party. This would serve to eliminate any possibility that the intended recipient, upon answering the telephone call, would be confused upon receiving the message with respect to whether they were directly speaking to the sending party or were receiving a recorded message from the sending party.

In this manner, a party who is not located in proximity to a message transmission system, and who desires to compose a message for an intended recipient, can remotely record the message and have the message automatically transmitted to the intended recipient after downloading the message to the sending party's PC. By utilizing the present invention, the sending party does not have to initiate the transmission of the message to the intended recipient. Therefore, the sending party does not have to look up telephone numbers or e-mail addresses for intended recipients in order to send the recorded messages to the intended recipients. The sending party merely places a spoken header on each message and the message transmission system utilizes this information to automatically, without intervention by the sending party, establish connections with the intended recipients' receiving devices and send the recorded messages to the intended recipients. In this manner, after composing the message, the only action required of the sending party is to download the recorded message to the transmission system. The sending party does not even have to listen to the tape again in order to determine who the messages are to be sent to. All of the information required to send a message to an intended recipient is obtained at the time of composing the message.

In operation, there are two alternative operating modes for the message transmission system of the present invention. The present invention can be operated in an Interactive Mode or a Stand-alone Mode. The interactive mode is utilized when the sending party wants to verify that the messages are being transmitted to the correct intended recipients based on the accessed routing access codes. In the interactive mode, after the sender connects the remote recording device 100 to the sending party's PC 120, as discussed previously, PC 120, before transmitting each message, will provide the sending party with the name and routing access code for the intended recipient. The name that PC 120 provides to the sender for verification is the name that is recognized and interpreted by the speech recognition software from the message header. The routing access code is that code that is accessed from database 124 by utilizing the identifying information in the message header. By reviewing the name provided by PC 120, the sending party is able to verify that the speech recognition software accurately recognized the identification information for the intended recipient that was contained in the message header. The interactive mode can either require an affirmative act by the sending party to verify the name and routing access code for the intended recipient, such as by striking a key on the PC's keyboard, or can be programmed to assume verification of the information after a specified time period, and thus to transmit the message, if no response from the user has been input to PC 120. Where an affirmative act is required from the sending party, which is defined as "preverification" of the intended recipient, messages cannot be sent to an incorrectly identified recipient without acknowledgment of that intended recipient by the sending party.

If the speech recognition system identifies an incorrect recipient, the sending party can input the correct identification information for the intended recipient into PC 120 and PC 120 can utilize this inputted correct information to access database 124 and obtain the routing access code for the correct intended recipient.

PC 120 can provide the name of the intended recipient to the sending party for verification by either audibly presenting the interpreted name to the sending party or by providing a written display of the interpreted intended recipient's name. The sending party can input corrected identification information for the intended recipient by either speaking a new, better pronounced header for recognition by the speech recognition software or by manually inputting the information into PC 120.

It is not required that PC 120 provide the sending party with both the name and routing access code for the intended recipient for verification. All that is required is that sufficient information be provided to the sending party such that the sending party is able to verify that the speech recognition software has correctly identified the intended recipient from the information contained in the message header.

In the interactive mode, in the situations where there is either no information contained in database 124 for an intended recipient or where there is information contained in the database for a particular intended recipient, e.g., the name of the intended recipient, but there is no routing access code available for the intended recipient, the sending party will again be provided with the recognized name of the intended recipient and will be prompted to manually input a routing access code for the intended recipient.

With the interactive mode, if all required information is not properly obtained by the message transmission system, it does not matter why the information was not properly obtained. The required information may not be properly obtained because the speech recognition software misidentified the intended recipient or because sufficient information related to the intended recipient was not contained in the database. In either situation, the sending party will be provided with the opportunity to input the required information.

As addressed above, the messaging system of the present invention can also be operated in the stand-alone mode. In the stand-alone mode, a recorded message is sent to an intended recipient without verification of the intended recipient by the sending party before transmitting the message. Whereas verification of the intended recipient is not accomplished before transmitting the message, an optional feature that can be incorporated into the present invention would allow the sending party to be able to determine, after transmission of the message, whether the message was sent to the correct intended recipient. This optional feature provides that when PC 120 sends a message to an intended recipient, PC 120 can also send the message to the sending party. When the message is sent back to the sending party, the messaging system will also provide the sending party with the name of the recipient of the message. In this manner, the sender is able to determine whether the message was correctly sent to the intended recipient. The message can be sent back to the sending party by either transmitting the message to the sending party's e-mail system or by sending the messages to the sending party's telephone or voice-mail system, such as can be done and as was explained previously for transmitting messages to the intended recipient. If the messages are sent back to the sending party via the sending party's e-mail system, then a text adder will be included with the message to indicate who that particular message was sent to. If the messages are sent to the sending party's telephone or voice-mail system, an audio adder will be included with the message and played back to the sending party to indicate who the message was sent to. In this manner, a sending party is able to determine who the actual recipients were for each message sent. If an error has occurred and a message was sent to the wrong recipient the sending party can take steps to resend the message to the correct recipient.

In the stand-alone mode, if the system is not able to determine who the recipient for the message is because either the speech recognition software could not recognize the identification information for the intended recipient in the message header or because no routing access code was contained in the database for the intended recipient, when the messaging system sends the message back to the sending party, the text or audio adder to the message, as described above, will indicate that the message was not delivered. Additionally, the system will provide the sending party with the system's interpretation of who the intended recipient was so that the sending party can determine whether the system incorrectly interpreted the intended recipient with the speech recognition software or whether the system correctly interpreted who the intended recipient was but was not able to transmit the message for other reasons, e.g., unavailable or inaccurate routing access code in the database. In this situation where the message can't be transmitted, as with the situation where the message was sent to the wrong recipient, the sending party can take steps to resend the message.

The sending party is also able to designate the method of transmission for, and thus the format of, each message to be transmitted. For example, the sending party can designate that the message be transmitted as either a voice-mail message or an audio file attachment to an e-mail message. Of course, the proper access codes must be contained in database 124 in order to implement the desires of the sending party and the sending party's PC must be suitably interconnected to the desired receiving device of the intended recipient, i.e., a computer, telephone or voice-mail system. The sending party can designate their desires for the method of transmission and format for each message by adding this information to the spoken header of the message or by inputting this information to database 124. If the information is added to the spoken header, the speech recognition software will interpret this information and direct the messaging system to transmit the message accordingly. If the information is input to the database, when the system accesses the database to determine a routing access code for the intended recipient, the system will also access the information for that particular intended recipient related to the desires of the sending party for transmitting the message to that particular intended recipient. Again, the messaging system will be directed to transmit the message according to this accessed information.

Figure 2:
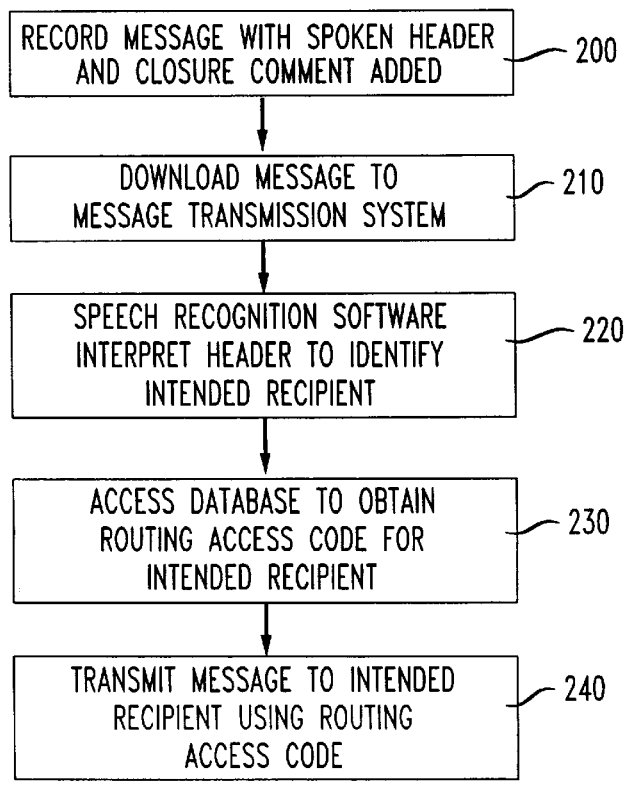
FIG. 2 illustrates a process flow chart for practicing a method in accordance with an embodiment of the present invention.

The basic method steps for practicing an embodiment of the present invention are illustrated in FIG. 2. As shown, step 200 is the step where the sending party remotely records a message for the intended recipient. The sending party adds a predefined spoken header before the actual subject matter of the message and adds a predefined spoken closure comment at the end of the message. The spoken header contains identification information for the intended recipient of the message. In step 210, the remotely recorded message is downloaded to a message transmission system. Step 220 is the step where the speech recognition software stored in the message transmission system interprets the identification information for the intended recipient that is contained in the spoken header. In step 230, the message transmission system accesses a database to determine a routing access code for the intended recipient. Step 240 illustrates the step where the message is transmitted to the intended recipient by the message transmission system by utilizing the routing access code for the intended recipient.

The method steps shown in FIG. 2 are not intended to be all inclusive of all of the features of the present invention, as described in this specification. The specification, when read as a whole, fully describes the messaging system of the present invention.

Several variations on the disclosed embodiments are contemplated. In the disclosed embodiments, the recording device 100 is disclosed as an analog tape player, however, any portable recording device could be utilized with the present invention. For example, a digital audio recording device, such as a digital audio tape (DAT) recorder or a notebook PC with a sound card, could be utilized. If a digital device was utilized, the sending party's PC would not be required to perform the analog to digital conversion of the text message. The message could be directly stored in the sending party's PC for transmission to an intended recipient as an audio message.

The recorded message was disclosed as containing a spoken trailer to identify the end of the recorded message, however, a trailer is not required. Because each message must contain a predefined header, when the speech recognition software recognizes this spoken header, the system will be able to determine that a new message has been started and, consequently, the previous message, if there was one recorded on the tape, has ended. Alternatively, if a digital audio tape was utilized to remotely record the message, a digital mark can be placed on the recording media to signify that a new message will follow. In this manner, the speech recognition software is not required to determine when a new message begins and ends, rather, the digital mark will be utilized to segment the messages. Therefore, the speech recognition software is only required to recognize and interpret the intended recipients for the messages.

It is also not required that the message be transmitted as an audio message. The speech recognition software is also able to recognize and convert to a text file the substantive message that is to be transmitted. In this manner, the message can be transmitted to an intended recipient as a textual document and is not required to be transmitted as an audio file. As speech recognition software continues to improve, the ability to convert increasingly complex spoken messages to text can be implemented in the present invention.

Whereas the disclosed embodiment transmits a message to a single recipient, messages can be sent to multiple recipients with the present invention. Multiple recipients can be included in the spoken header for a message or a single recipient identifier (e.g., a soccer team) could be utilized to access multiple recipient access codes from the database. In either situation, the system would transmit the message to all intended recipients.

Additionally, the message transmission system for the sending party is disclosed as a personal computer that contains speech recognition software, however, other embodiments are possible. For example, the speech recognition software could be contained in a network and the sending party could utilize an input device to download the recorded message to the network where the spoken header would be interpreted and the database would be accessed. The network would then transmit the message to the intended recipient. The network in this example could be either a telephone network, an integrated services network (e.g., the Internet), or a data network. If a telephone network was implemented, the user input device could be the user's telephone and if a data or integrated services network was implemented, the sending party's personal computer could still be utilized as the user input device.

The disclosed embodiments are illustrative of the various ways in which the present invention may be practiced. Other embodiments can be implemented by those skilled in the art without departing from the spirit and scope of the present invention.

What is claimed is:

1. A method for generating and transmitting a message to an intended recipient comprising the steps of:

remotely recording an audio message to be sent to an intended recipient wherein the message contains a spoken header and wherein said spoken header identifies the intended recipient;

removably connecting an audio recording device containing the remotely recorded message to a message transmission system that includes speech recognition software;

downloading said remotely recorded message from the audio recording device to the message transmission system; and automatically transmitting said remotely recorded message from the message transmission system to the intended recipient based on said spoken header, wherein said remotely recorded message is transmitted to the intended recipient as an audio file attachment to an e-mail message.

2. A messaging system for generating and transmitting a message to an intended recipient comprising:

a remote recording device wherein said remote recording device records an audio message to be transmitted and wherein the audio message contains a spoken header containing identification information for an intended recipient; and a message transmission system wherein said remote recording device is removably connected to said message transmission system and wherein said message transmission system includes speech recognition software;

wherein said message transmission system automatically transmits the recorded message via electronic mail to an intended recipient based on said spoken header as interpreted by said speech recognition software.

3. The messaging system for generating and transmitting a message to an intended recipient of claim 2 wherein said remote recording device is a portable analog audio tape recorder or portable digital recording device.

4. The messaging system for generating and transmitting a message to an intended recipient of claim 2 wherein said message transmission system is a computer interconnected to a network.

5. The messaging system for generating and transmitting a message to an intended recipient of claim 4 wherein said network is the Internet.

6. A method for generating and transmitting a message to an intended recipient comprising the steps of:

remotely recording an audio message to be sent to an intended recipient wherein the message contains a spoken header and wherein said spoken header identifies the intended recipient;

removably connecting an audio recording device containing the remotely recorded message to a message transmission system;

downloading said remotely recorded message to a message transmission system; and automatically transmitting said remotely recorded message to the intended recipient based on said spoken header, wherein said remotely recorded message is transmitted to the intended recipient as an audio file attachment to an e-mail message.

7. The method for generating and transmitting a message to an intended recipient of claim 6 wherein said step of remotely recording a message is accomplished by utilizing a portable audio recording device.

8. The method for generating and transmitting a message to an intended recipient of claim 6 wherein said message transmission system is a personal computer interconnected to a network.

9. The method for generating and transmitting a message to an intended recipient of claim 6 wherein said message transmission system is a telephone network.

10. The method for generating and transmitting a message to an intended recipient of claim 6 wherein said spoken header is utilized to access a database to obtain a routing access code for the intended recipient.

11. The method for generating and transmitting a message to an intended recipient of claim 10 further comprising the step of:

verifying the intended recipient's routing access code prior to transmitting said remotely recorded message to the intended recipient.

12. The method for generating and transmitting a message to an intended recipient of claim 11 further comprising the step of:

correcting the intended recipient's routing access code prior to transmitting said remotely recorded message to the intended recipient.

* * * * *